United States Patent [19]

Kurz

[11] Patent Number: 5,386,571
[45] Date of Patent: Jan. 31, 1995

[54] COMPUTER SYSTEM AND METHOD FOR STORING AND DISPLAYING OF A SEMANTICALLY STRUCTURED ENTITY RELATIONSHIP DIAGRAM

[75] Inventor: Wolfgang Kurz, Stuttgart, Germany

[73] Assignee: International Business Machines Corporation, Armonk, N.Y.

[21] Appl. No.: 123,391

[22] Filed: Sep. 17, 1993

[30] Foreign Application Priority Data

Sep. 19, 1992 [EP] European Pat. Off. ............ 92116044

[51] Int. Cl.⁶ .............................................. G06F 3/153
[52] U.S. Cl. .............................. 395/700; 364/DIG. 1; 364/237.3; 364/286.3
[58] Field of Search ..................... 395/600, 700, 157

[56] References Cited

U.S. PATENT DOCUMENTS 4,479,196 10/1984 Ferrer et al. ................. 364/DIG. 1
5,021,989 6/1991 Fujisawa et al. ............. 364/DIG. 1
5,175,813 12/1992 Golding et al. ...................... 395/157

OTHER PUBLICATIONS

"From Entity-Relationship Diagrams to Fourth Normal Form: A Pictorial Aid to Analysis", K. S. Dawson et al, Computer Journal, vol. 31, No. 3, Jun. 1988, Cabridge, Gr. Britain.

"Graphical Query Languages for Semantic Database Models", B. Czejdo et al, AFIPS Conference Proceedings, vol. 56, Jun. 1987, Chicago.

"BRMQ: A Database Interface Facility Based on Graph Traversals and Extended Relationships on Groups of Entities", Computer Journal, vol. 31, No. 3, Jun. 1988, Cambridge, GB.

Primary Examiner—Thomas M. Heckler
Attorney, Agent, or Firm—Mark S. Walker

[57] ABSTRACT

The invention concerns a method and system for storing and displaying an entity relationship diagram. The entity relationship diagram of the invention is composed of only four different classes of allowed entity types. Thereby redundancy is eliminated and less storage locations are needed to store the diagram. The diagram comprises kernel entity sets K, attributive entity sets A, role entity sets P and relation entity sets R which are displayed on a display 9.

19 Claims, 9 Drawing Sheets

COMPUTER SYSTEM AND METHOD FOR STORING AND DISPLAYING OF A SEMANTICALLY STRUCTURED ENTITY RELATIONSHIP DIAGRAM

BACKGROUND OF THE INVENTION

1. Field of the Invention

This invention relates to a method for storing of an entity relationship diagram in a computer system, to a method for displaying of an entity relationship diagram on the display of a computer system and to a computer system for displaying of an entity relationship diagram.

2. Background and Prior Art

The point of departure of the present invention is the entity relationship model as described in ACM Transactions on Data Based Systems, Volume 1, No. 1, March 1976, Peter Pin-Shan Chen "The Entity-Relationship Model—Toward a Unified View of Data", pages 9-36. The entity-relationship model proposed by Chen is a data model. This model incorporates some of the important semantic information about the real world serving as a tool for data based design. The corresponding diagrammatic technique proposed by Chen is not optimal. This is because—especially in a complex diagram—a lot of redundancy is implemented, which has negative effects both on the intelligibility of the diagram and also on the number of memory locations necessary to store the diagram as well as the number of memory locations necessary to store data and access paths in a resulting relational database.

From U.S. Pat. No. 4,479,196 to Ferrer et al. a modified diagrammatic technique to represent an entity relationship model is known for usage in a data base system. This technique is directed to represent data bases in a form which is readily processed and efficiently utilized by digital computers. However the above stated drawbacks of the original technique proposed by Chen are not solved thereby.

SUMMARY OF THE INVENTION

It is therefore an object of the present invention to provide an improved method for storing of an entity relationship diagram in a computer system and an improved method and computer system for displaying of an entity relationship diagram. The invention is particularly aimed to reduce the redundancy of information shown in the incarnation of an entity relationship diagram so that improved storing and displaying thereof is accomplished.

The objects of the invention are solved basically by applying the features laid down in the independent claims. Preferred embodiments of the invention are laid down in the dependent claims.

The invention particularly provides for a novel diagrammatic technique to represent an entity relationship model. An entity relationship diagram according to the invention is characterized by the following principles:

1. An entity relationship diagram of the invention is composed of kernel entity sets $K_i$ and relation entity sets $R_i$.
2. A kernel entity set $K_i$ is a class of kernel entities $e_i$.
3. A relation entity set $R_i$ is a class of relations among kernel entities $e_i$, each taken from a kernel entity set $K_i$ according to the definition D $$D: \{[e_1, e_2, \ldots e_n] | e_1 \in K_1, e_2 \in K_2, \ldots e_n \in K_n\},$$

and where the kernel entity sets $K_i$ in the definition D may not be distinct.

4. The inventive entity relationship diagram may further comprise role entity sets $P_i$. A role entity set $P_i$ is a class of roles of entities $e_i$ comprised in a kernel entity set $K_i$. Each role entity set $P_i$ exclusively belongs to a specific one of the kernel entity sets $K_i$.
5. The inventive entity relationship diagram may further comprise attributive entity sets $A_i$. An attributive entity set $A_i$ has an attribute associated thereto. An attribute is defined as a function f which maps from a kernel entity set $K_i$ or a role entity set $P_i$ into an attributive entity set $A_i$ or a cartesian product of attributive entity sets $A_i$. The function f is given as $$f: K_i \text{ or } P_i \rightarrow A_i \text{ or } A_{i1} \times A_{i2} \times \ldots \times A_{in}.$$

Each attributive entity set $A_i$ exclusively belongs to a specific one of the kernel entity sets $K_i$.

These are the only allowable types of entity sets in the inventive entity relationship diagram. Especially—as opposed to the prior art—no relation entity sets $R_i$ are allowed between role or attributive entity sets. Thus the kernel entity sets $K_i$ are closed information objects. The internal structure of these objects preferably is further specified by role and/or attributive entity sets. No direct relations among role or attributive entity sets are allowed regardless whether they belong to the same or different kernel entity sets $K_i$. As a consequence the entity relationship diagram according to the invention does not comprise any redundant information, since relations are only allowed between kernel entity sets $K_i$.

This results in an improved method for storing of an entity relationship diagram according to the invention, since the same amount of information contained in an entity relationship diagram is stored in a smaller number of storage locations as compared to the prior art. According to the inventive method for storing of an entity relationship diagram only first and second data is stored. The first data is representative of a sequence of kernel entity sets $K_i$, whereas the second data is representative of relation entity sets $R_i$. The second data comprise information as to the assignment of each of the relation entity sets $R_i$ to at least one of the kernel entity sets $K_i$. Therefore, it is not necessary to store the absolute positions of the entity sets in the entity relationship diagram of the invention. The computer reconstructs automatically the entity relationship diagram from the information stored as to the types of individual entity sets and their assignment to each other. This results in a smaller amount of storage locations needed to store the diagram.

Therefore the inventive method for storing is advantageous, since—as compared to prior art method—less storage space is needed. Further the inventive method requires only two data sets—the first and the second data—so that this method is easily implemented. Further the time needed to carry out this method is comparatively small due to its relative simplicity.

Further the invention provides a method for displaying of the entity relationship diagram on the display of a computer system. According to this inventive method, first the display is logically partitioned into at least a first and a second section. This step of partitioning preferably is carried out by logically dividing the display into two sections along a horizontal or vertical line. The position of this partitioning line is preferably inputted by special input means, such as a mouse.

The kernel entity sets $K_i$ of the entity relationship diagram of the invention are displayed in the first section of the display—such as the lower section, if the display is partitioned by a horizontal line. The kernel entity sets $K_i$ are represented by a first class of symbols. These symbols are displayed in order to indicate the kernel entity sets $K_i$ on the display.

Further, relation entity sets $R_i$ are displayed in the second section of the display. The relation entity sets $R_i$ are represented by a second class of symbols on the display.

As stated above the entity relation diagram of the invention does not comprise redundant information. This is due to the specific definition of different classes of entity sets and their allowed interrelations. Thus the inventive method for displaying is particularly advantageous in that a smaller storage space is required for storing of the entity relationship diagram in the computer system. Further the density of the information displayed on the display of the computer system is increased because of that redundancy free entity relationship diagram. This has the further technical advantage that much more information is displayed on a display of the same size as compared to the prior art. This is also beneficial in that screen scrolling or zooming functions need to be used less frequently because of the higher density of the information displayed and the elimination of redundant information.

Further an entity relationship diagram displayed according to the inventive method for displaying is easily modifiable or may even be merged with another entity relationship diagram according to the invention. This is because of the logical partitioning of the display and the particular definition of the entity sets and their interrelations. The invention makes it possible to add additional entity sets to an existing entity relationship diagram without manual modification of the existing diagram. If the symbols representing the different classes of entity sets, such as kernel entity sets $K_i$, relation entity sets $R_i$, role entity sets $P_i$ and attributive entity sets $A_i$ are arranged in an array of allowable positions on the display, the inventive entity relationship diagram becomes even more readily intelligible and modifiable.

In particular, it is possible to store the entity relationship diagram of the invention as a vectorgraph. That is that the absolute coordinates relative to the display of the computer system of the symbols to be displayed are stored. This may be done by means of a computer aided software engineering tool, such as the "application development workbench" by KnowledgeWare Inc. which belongs to the AD/Cycle application development toolset.

It is however particularly advantageous to employ the inventive method for storing of the entity relationship diagram in the inventive method for displaying. This is because less storage space is needed in this case. Further any modifications of the entity relationship diagram to be displayed are more easily performed, if the inventive method for storing is employed. According to the inventive method for storing semantic information is stored, not only the absolute coordinates of the symbols to be displayed. This semantic information may comprise the relative positions of the entities to be displayed relative to each other. Therefore entity sets are easily insertable or erasable from the diagram. If for example the first data represent a sequence of kernel entity sets $K_i$ displayed along a horizontal or vertical line an arbitrary kernel entity set $K_i$ is easily insertable in kernel entity set $K_a$ relative to a neighboring kernel or erasable from that line. This is accomplished by specifying the relative position of the additional kernel entity set $K_a$ relative to a neighboring kernel entity set $K_i$. The semantic information comprised in the first and the second data allows the computer to generate the entity relationship diagram automatically based on that information.

The invention further provides for a computer system for displaying of an entity relationship diagram. The computer system particularly comprises means for generating the symbols which represent the different classes of entity sets on the display, whereby these means for generating are interconnected to the means for storing of data representative of the different classes of entity sets. Again it is particularly advantageous to store the data representative of the different entity sets according to the inventive method for storing.

It is to be noted that the invention is applicable in different environments. In particular, the invention is advantageously applied in the repository application generator disclosed in EP-A-O 438 843, in the knowledge based systems disclosed in WO 89/09970, in the computeraided software engineering facility disclosed in WO 91/08543 as well as in .the software distribution system disclosed in WO 91/08542.

Further the invention supports the implementation of a relational or object-oriented data base for storing of instances of the entity sets of the entity relationship diagram. The inventive diagrammatic technique is also used in the development of software, such as application software. Once the entity relationship diagram is stored in a computer system according to the invention, the software development is carried out computer aided and thus at least semi-automatically. This is because of the semantic information which is carried in the entity relationship diagram which makes it possible to employ e.g. a knowledge base or an expert system in order to facilitate and speed up software development. The invention is further particularly advantageous because re-useability of software modules, such as subroutines or application programs, is enhanced. This is accomplished because of the particular definition of the entity sets according to the invention. If there is a particular software module available which carries out a specific function on the entities comprised in a kernel entity set, this module is re-usable for different subclasses of entities belonging to different attributive or role entity sets of the same kernel entity set.

BRIEF DESCRIPTION OF THE DRAWING

In the following preferred embodiments of the invention are described in more detail with reference to the drawing in which.

DETAILED DESCRIPTION OF THE PREFERRED EMBODIMENT

Figure 1:
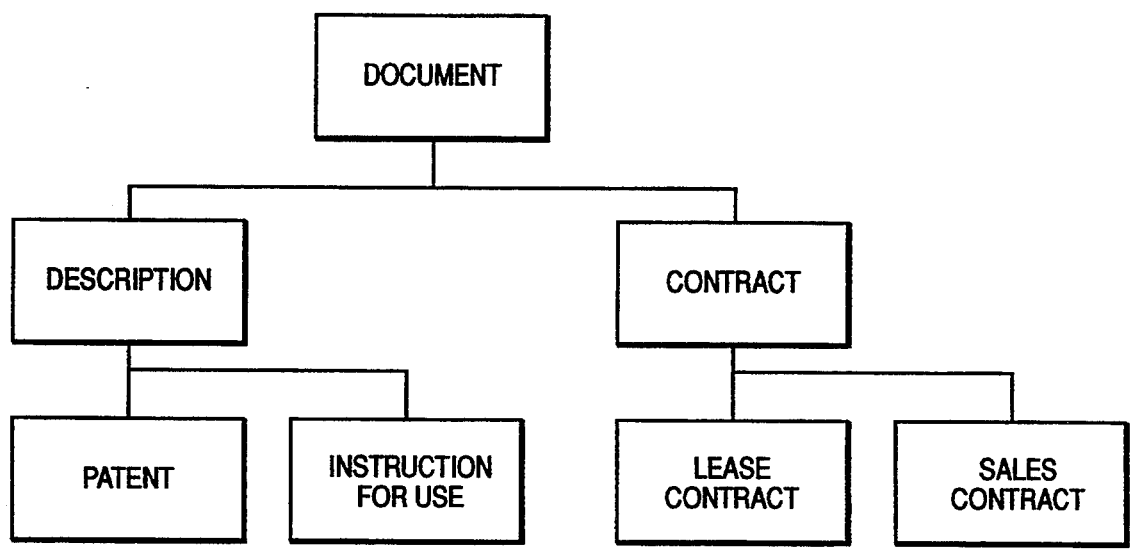
FIG. 1 is a diagrammatic illustration of the principles of object-oriented data-analysis.

With reference to FIG. 1 the principles of object-oriented data-analysis are explained in brief since the teaching of the invention also incorporates the principles of object-oriented data-analysis. Object-oriented data-analysis implies that the structure to be analyzed is split up in a number of entities. The interrelationship between these entities is analyzed. This results in a hierarchical structure. The entities are arranged on different levels of the hierarchical structure. Entities on lower levels of hierarchy have the same properties than those situated on higher levels of the hierarchy, if there is an interrelationship between a lower level entity and a higher level entity. This results in redundancy free data modelling and data storage, if those attributes which are common to a group of entities are always assigned to the highest level entity possible.

This is shown in FIG. 1 by way of example. FIG. 1 concerns the analysis of structures comprising a plurality of different document types. The entity "document" which is shown on top of the diagram and which does thus have the highest hierarchical order may comprise attributes such as document number and document title. Those attributes are "inherited" by the lower level entities "description" and "contract" which are placed one level below the entity document. The same applies analogously for the entities of the lowest level of the hierarchy. These are "patent", "instruction for use", "lease contract" and "sales contract". The entities "patent" and "instruction for use" are related to the higher level entity "description", whereas the entities "lease contract" and "sales contract" are related to the higher level entity "contract". The entity "contract" may comprise the additional attributes date of signature and period of validity. Further the entity "lease contract" may comprise the additional attribute amount of bail. Thus the entity "lease contract" is characterized by the attributes of the entity "document." together with the attributes of the entity "contract" and the additional attributes of the entity "lease contract". The entity "lease contract" is only characterized without ambiguity by all of the above mentioned attributes belonging to the entities "document", "contract" and "lease contract". The above described analysis is a helpful tool in software engineering. This analysis is helpful in making certain programs or subroutines of programs more generally applicable to different types of entities. A software module e.g. serving to retrieve an arbitrary document may be used for retrieval of a patent as well as for retrieval of a sales contract.

Figure 2A:
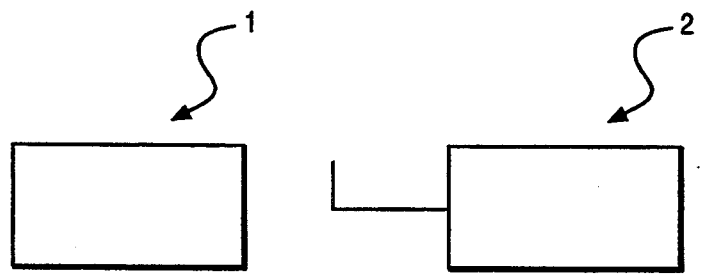
FIGS. 2A to 2C are diagrams showing two different classes of symbols which represent kernel entity sets $K_i$ and role entity sets $P_i$, respectively.
Figure 2B:
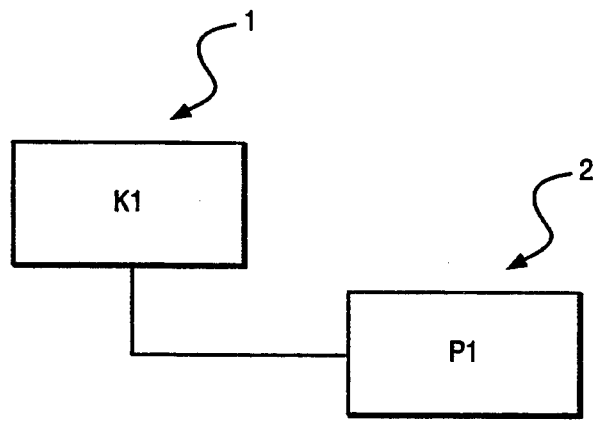
Figure 2C:
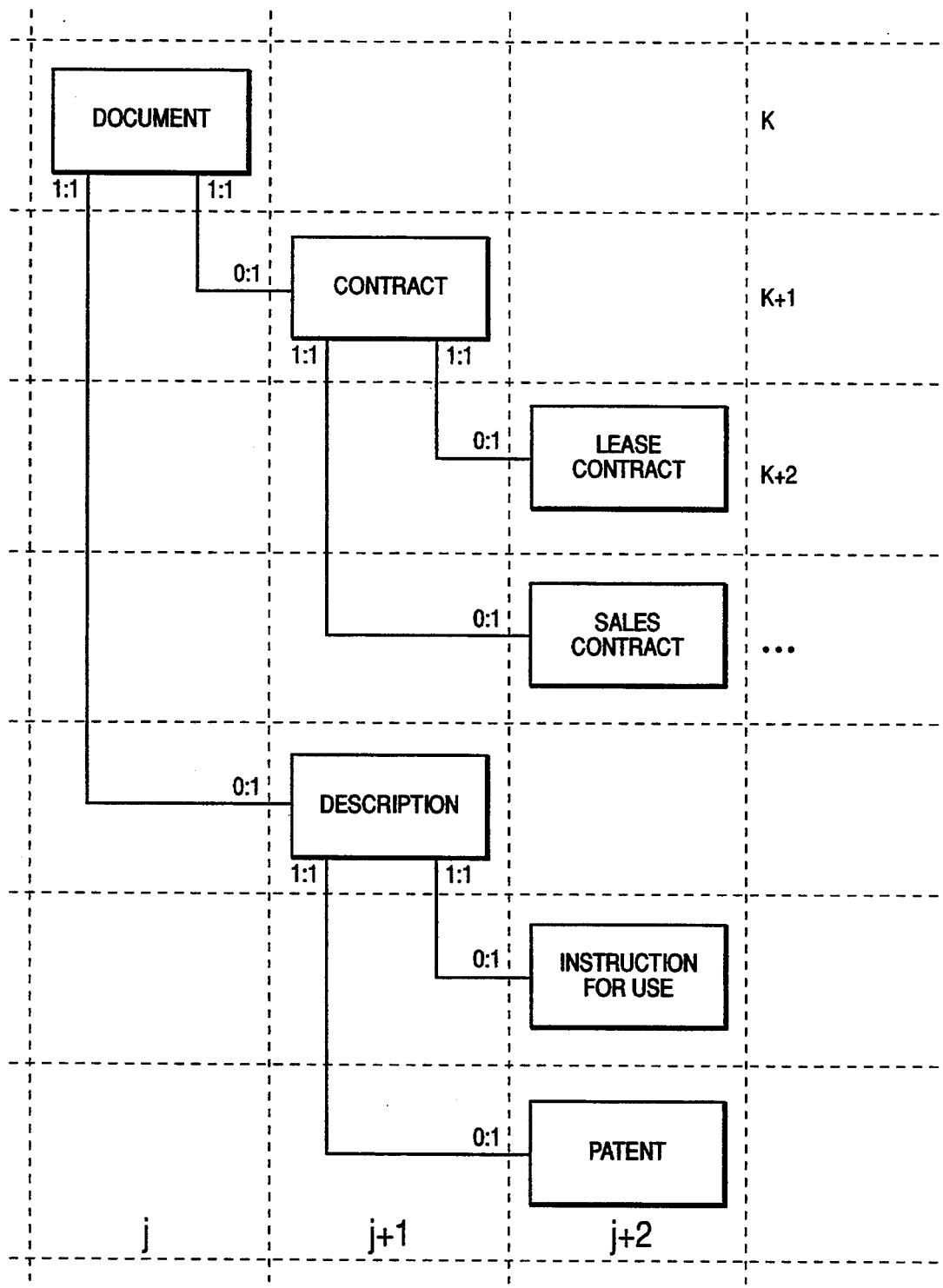

In the following the entity relationship diagram of the invention incorporating the above described principles of object-oriented data-analysis is described. In FIG. 2A two classes of symbols 1 and 2 are shown. The class of symbols 1 is a rectangular shaped box whereas the class of symbols 2 is a rectangular shaped box with an upwards bended line, which in this example is hook-like. The class of symbols 1 represents kernel entity sets $K_i$ whereas the class of symbols 2 represents role entity sets $P_i$. A role entity set $P_i$ is a class of roles of entities $e_i$ comprised in a kernel entity set $K_i$. This is symbolized in FIG. 2B where the role entity set $P_1$ is a class of roles of entities $e_i$ comprised in the kernel entity set $K_1$. FIG. 2C shows the example of FIG. 1 in the notation according to the invention. The entity sets "contract" and "description" are role entity sets of the kernel entity set "document". The role entity sets "lease contract" and "sales contract" are assigned to the role entity set "contract", thus specifying an even more restricted class of roles of entities $e_i$ comprised in the kernel entity set "document". The same applies analogously to the entity sets "instruction for use" and "patent". The diagram can distinguish between 1:n, m:n and 1:1 mappings, where m, n=0,1,2 . . . . This is according to the above cited paper by Chen, page 20, paragraph 6, (4). In this example the following additional rules are applied:

1. The kernel entity set which in this case is "document" is the hierarchical top of the structure shown in FIG. 2C and is therefore positioned on top of the diagram, in this case in the upper left corner.
2. The role entity sets are placed below this higher order kernel entity set "document" and are offset to the right by a predefined distance. In the case of the role entity sets "contract" and "description" the role entity sets are offset with respect to the kernel entity set whereas role entity sets which are subsets of other role entity sets are offset with respect to the role entity sets of which they are a subset. This is the case for the role entity sets "lease contract" and "sales contract" which are subsets of "contract". It is to be noted that the entity sets shown in FIG. 2C are arranged in an array of rows k and columns j. The kernel entity set "document" is placed in the upper left position k, j of this array. The role entity sets "contract" and "description" which are one hierarchical order below the kernel entity set "document" are placed in the next column j+1. The same applies analogously for the further role entity sets even one hierarchical order below the role entity sets "contract" and "description,. These are placed in the column j+2.
3. The mapping of a higher order entity sets is always a "may be" interrelation. The mapping is always 0:1 (is or is not).
4. The interrelation of a subordinated role entity set to a higher order role entity set or kernel entity set to which it belongs is always a 1:1 relation. The mappings are also indicated in the diagram,
5. Roles comprised in different ones of the role entity sets may belong to the same entity comprised in the kernel entity set. A document for example may have at the same time a role "contract" as well as a role "description".

Figure 3A:
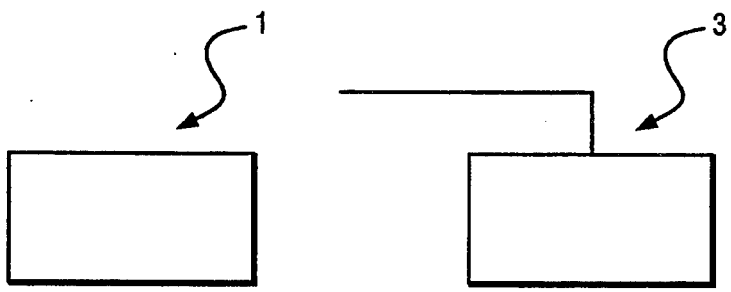
FIGS. 3A to 3C are diagrams showing a further class of symbols which represent attributive entity sets $A_i$.
Figure 3B:
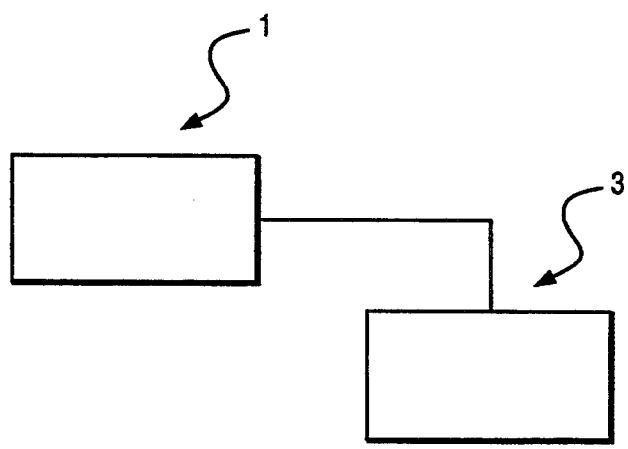
Figure 3C:
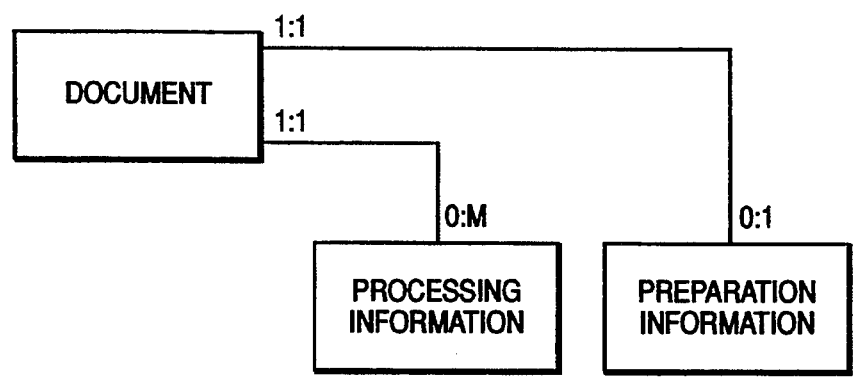

With reference to FIGS. 3A and 3B now a further element of the inventive entity relationship diagram is described in the following. In FIG. 3A a further class of symbols 3 is shown as well as the class of symbols 1 representing a kernel entity set $K_i$. The class of symbols 3 is a rectangular shaped box with another type of a downwards bended line, which in this example is shaped like a handle. This class of symbols 3 represents attributive entity sets $A_i$. In the case shown in FIG. 3B the attributive entity set 3 belongs to the kernel entity set 1 which is symbolized by the interconnection of the bended line of the class of symbols 3 with the rectangular shaped box of the class of symbols 1. Attributive entity sets $A_i$ are helpful to specify particular logical features of an entity set, such as a kernel entity set $K_i$. In the example shown in FIG. 3C the kernel entity set "document" has the attributive entity sets "processing information" and "preparation information" In the diagram shown in FIG. 3C the following rules apply:

1. The kernel entity e.g. "document" is positioned in the upper left corner of the diagram..
2. The attributive entity sets e.g. "processing information" and "preparation information" are displayed one level below their kernel entity set "document" and are offset to the right. In general all attributive entity sets $A_i$ which belong to a particular entity set, such as the kernel entity set $K_i$ or a role entity set $P_i$, are displayed in the same row in the diagram.
3. The mapping of an entity set to its attributive entity set $A_i$ is always a "has" interrelation, or with other words the mapping is 0:M, where $M=0, 1, 2, \ldots$ that is each attributive entity set $A_i$ may comprise no, one or a plurality of instances belonging to an entity $e_i$ of the entity set to which the attributive entity set $A_i$ belongs.
4. The interrelation of an attributive entity set and its corresponding base entity set is always a "belongs to" interrelation or—with other words—the mapping is always 1:1.

Figure 4A:
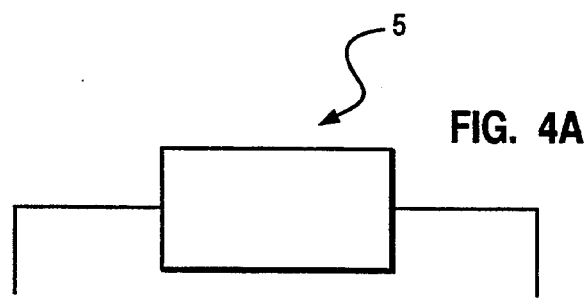
FIGS. 4A to 4E are diagrams showing an even further class of symbols which represent relation entity sets $R_i$.
Figure 4B:
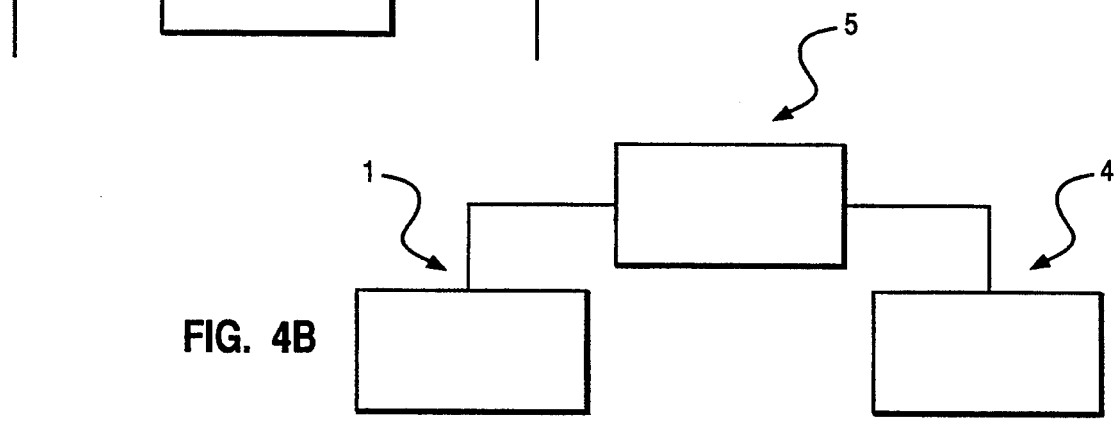
Figure 4C:
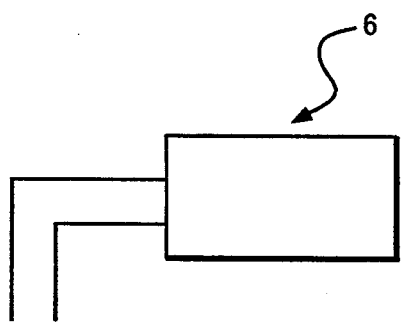
Figure 4D:
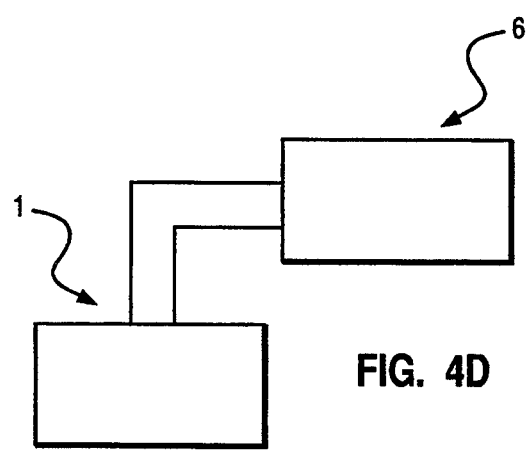

In FIG. 4A a further class of symbols 5 is shown by way of example. The class of symbols 5 is a rectangular shaped box with two hook-like downward bended lines. This class of symbols 5 represents relation entity sets $R_i$. In the example shown in FIG. 4B the relation entity set 5 defines a set of relations between the kernel entity sets 1 and 4. The class of symbols 5 comprises also a class of symbols 6 which is shown in FIG. 4C. This class of symbols 6 is to represent relation entity sets $R_i$ where the kernel entity sets $K_i$ in the definition D are not distinct. Therefore the two bended lines in this case point into the same direction as opposed to the case shown in FIG. 4B. In the example shown in FIG. 4D the relation entity set 6 is assigned to the kernel entity set 1. The relation entity sets $R_i$ according to the invention are advantageously used in order to represent relations between kernel entity sets $K_i$. In the example shown in FIG. 4E the kernel entity sets "person" and "document" are shown. The relation entity set "person to person relation" is represented by a symbol 6 whereas the relation entity set "person to document relations" is represented by a symbol 5. The following additional rules are applied in the diagram shown in FIG. 4E:

1. The kernel entities "person" and "document" are positioned in the same row in the diagram.
2. The mapping between a kernel entity set $K_i$ and a relation entity set $R_i$ is always 0:M, whereas the mapping between a relation entity set $R_i$ and a kernel entity set $K_i$ is always 1:1.

Figure 4E:
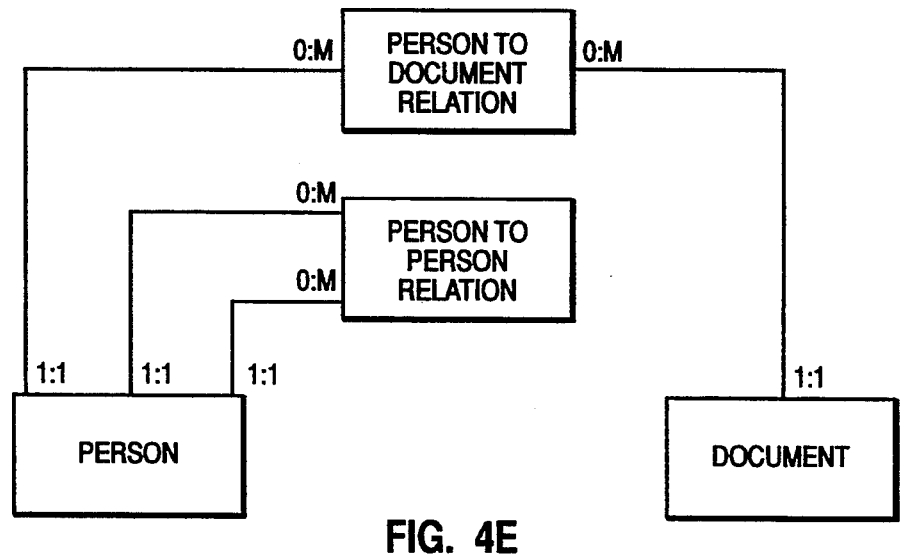

In the example shown in FIG. 4E this means that an entity "person" appears in none or a plurality of relation entity sets "person to document relation". A particular "person to document relation" does always concern a specific entity of the kernel entity set "document". Analogously a particular "person to document relation" does always refer exclusively to a specific "person".

Figure 5:
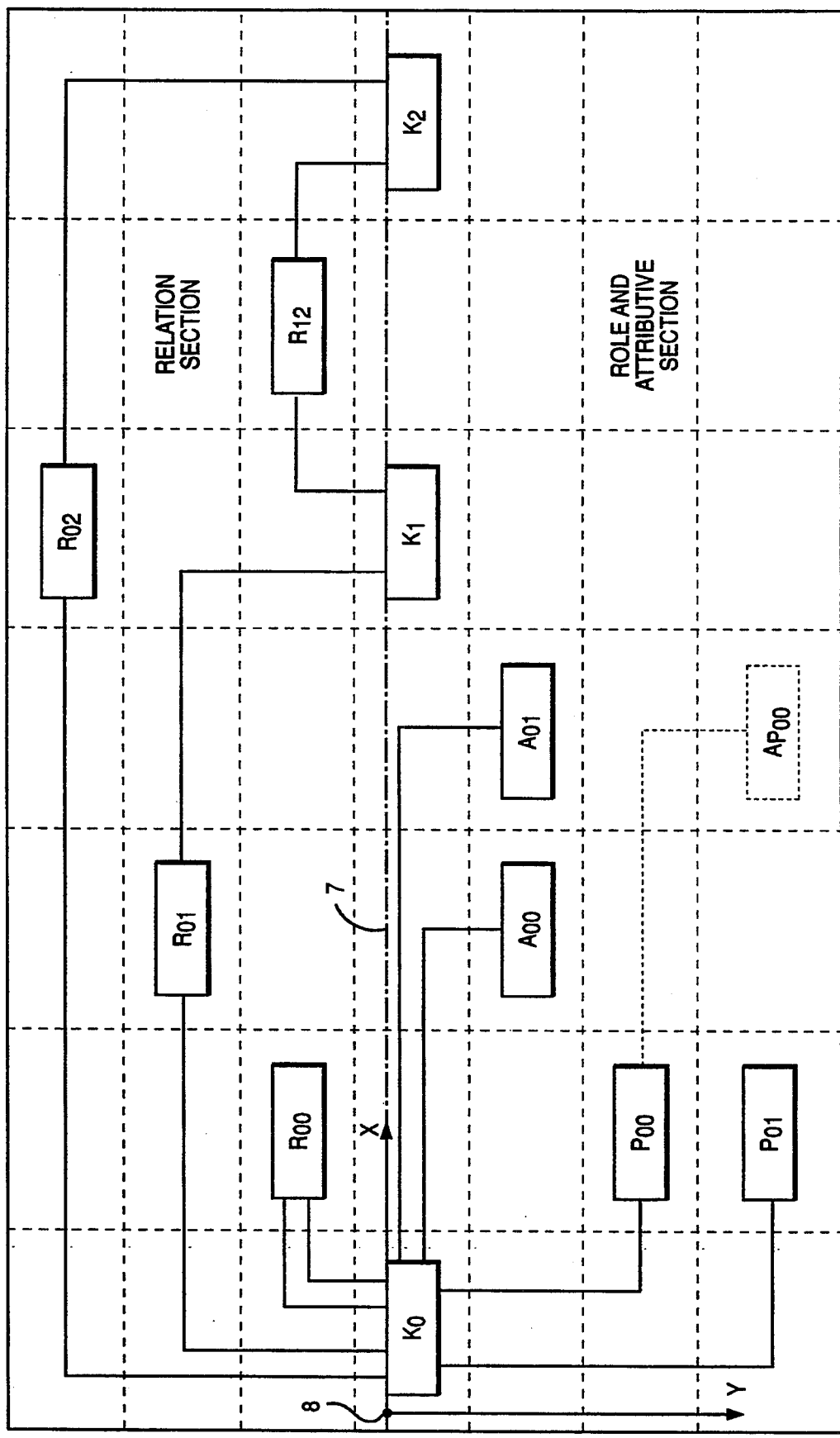
FIG. 5 shows an example of the entity relationship diagram of the invention.

In FIG. 5 a more complex example of an entity relationship diagram according to the invention is shown. The entity relationship diagram is displayed on a display 9 of a computer system. It comprises the kernel entity sets $K_0$, $K_1$ and $K_2$, the relation entity sets $R_{00}$, $R_{01}$, $R_{02}$ and $R_{12}$ as well as the attributive entity sets $A_{00}$ and $A_{01}$ and the role entity sets $P_{00}$ and $P_{01}$. The kernel entity sets are displayed along a horizontal line 7 which is indicated by the dashed line. The horizontal line 7 partitions the display into a first and a second section. The first section is the relation section where the relation entity sets are displayed and the second section is the kernel section where the kernel entity sets, and optionally the attributive entity sets and the role entity sets are displayed. For simplicity the attributive entity sets and role entity sets of the kernel entity sets $K_1$ and $K_2$ of FIG. 5 are not shown in the diagram. In this example the symbols representing the different entity sets are arranged in an array of allowable positions on the display 9. This array of allowable positions is indicated by the grid of lines shown in FIG. 5. The point 8 defines the origin of a coordinate system x, y of this array.

Figure 6A:
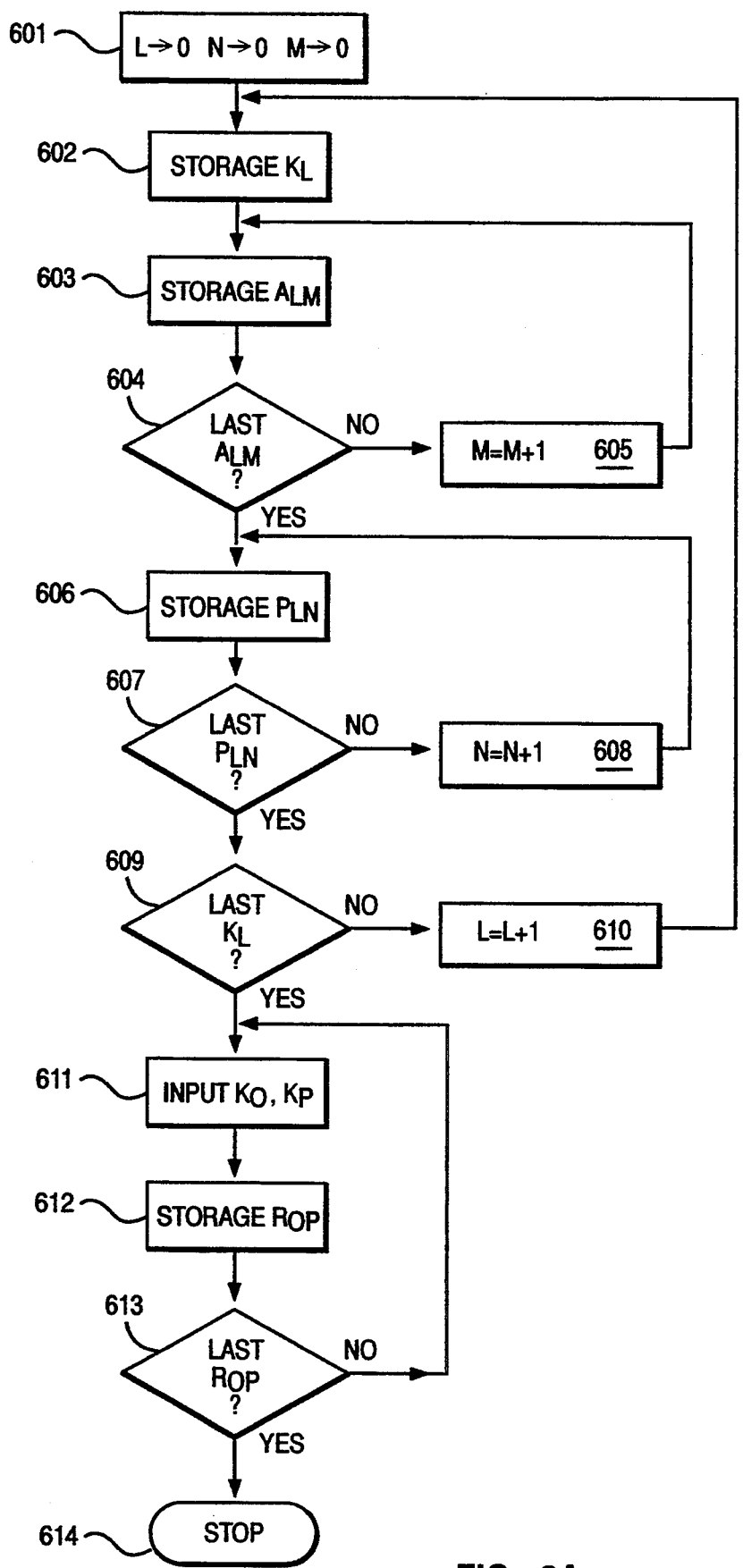
FIGS. 6A and 6B show flow charts illustrating storing and displaying of an entity relationship diagram of the invention.

The flow-chart shown in FIG. 6A illustrates the method for storing of the entity relationship diagram shown in FIG. 5 by way of example. In step 601 the variables L, M and N are initialized to equal 0. These variables are indices of kernel entity sets $K_L$, attributive entity sets $A_{LU}$ and role entity sets $P_{LN}$, respectively. In step 602 a first kernel entity set $K_0$ is stored. Subsequently the attributive entity sets $A_{00}$ and $A_{01}$ are stored in steps 603, 604 and 605. In step 603 the attributive entity set $A_{00}$ is stored. In step 604 it is decided whether all attributive entity sets $A_{0M}$ are already stored. Since in this case the decision is "no" the variable M is incremented in step 605 and the control returns to step 603 wherein the attributive entity set $A_{01}$ is stored.

If the decision taken in step 604 is "yes" the role entity sets $P_{00}$ and $P_{01}$ of the diagram shown in FIG. 5 are stored in steps 606, 607 and 608. First in step 606 the role entity set $P_{00}$ is stored. Then step 607 is carried out where it is decided whether all role entity sets $P_{0N}$ are already stored. Since in this case the decision is "no", the variable N is incremented in step 608, so that consequently in step 606 the role entity set $P_{01}$ is stored.

If the decision taken in step 607 is "yes", it is decided in step 609 whether all kernel entity sets $K_L$ are already stored. If the decision is "no" the variable L is incremented in step 610 and the control returns back to step 602 so that a further kernel entity set $K_1$ together with, its attributive entity sets and role entity sets is input. This is repeated for all kernel entity sets which are to be stored.

In steps 611, 612 and 613 the relation entity sets $R_{OP}$—in this case $R_{00}$, $R_{01}$, $R_{02}$ and $R_{12}$—are stored. In step 611 the kernel entity sets of the relation entity set which is to be stored are inputted. In this example only two kernel entity sets $K_O$ and $K_P$ are involved. In the subsequent step 612 the corresponding relation entity set $R_{OP}$—such as the relation entity $R_{01}$—is stored. Subsequently it is decided in step 613 whether all relation entity sets are already stored. If the decision is "no", the control returns back to step 611 so that the missing relation entity sets are stored subsequently. If the decision of step 613 is "yes" the flow of operations stops at step 614.

In particular the following information is thereby stored in the computer system:
1. The name of every entity set in the entity relationship diagram;
2. the type of every entity set.
3. According to the type of a particular entity set the following information is stored additionally:
   a) kernel entities $K_L$
      the sequence number L which defines the position of the kernel entity $K_L$ in the diagram relative to the origin of the coordinate system.
   b) Attributive entity sets $A_{LM}$
      the name of the entity set to which the attributive entity set $A_{LM}$ belongs;
      the sequence number M which defines the position of the attributive entity set in the diagram relative to the entity set to which it belongs, which is named "mother entity set" in the following;
      the mapping of the interrelation between the mother entity set and the attributive entity set.
   c) Role entity sets $P_{LN}$
      the name of the mother entity set
      the sequence number N which defines the position of the role entity set in the diagram relative to the mother entity set.
   d) Relation entity set $R_{UP}$
      name of the first kernel entity set $K_U$
      name of the second kernel entity set $K_P$,
      the mappings of the interrelations between the role entity set $R_{UP}$ and the corresponding kernel entity sets $K_U$ and $K_P$.

The above described inventive method for storing of an entity relationship diagram is particularly beneficial, if it is used together with the inventive method for displaying of an entity relationship diagram.

It is to be noted that the above described example, shown in FIG. 5, only comprises attributive and relative entity sets having a kernel entity set $K_L$ as mother entity set. In the more general case the mother entity set of a role entity set may be a kernel entity set $K_L$ or another role entity set as it is shown in FIG. 2C. Further the mother entity set of an attributive entity set may be a kernel entity set $K_L$ or a role entity set.

It is thus possible e.g. that the role entity set $P_{00}$, shown in FIG. 5, is the mother entity set of a further attributive entity set $A_{P00}$ belonging to $P_{00}$.

This is indicated by the dashed lines in FIG. 5. If the attributive entity set $A_{P00}$ is present, the role entity set $P_{01}$ is placed one row below at (x=1, y=4).

In the more general case considered here, the flow of operations for storage illustrated in FIG. 6A is modified.

After step 606 the attributive entity set or sets belonging to the role entity set $P_{LN}$ are stored as well as the role entity set or sets having $P_{LN}$ as mother entity set. This procedure is repeated iteratively for these role entity set or sets, if there is a mother entity set to further role entity set or sets or to a further attributive entity set or sets among these role entity set or sets. It is to be noted that an attributive entity set may not be a mother entity set in order to avoid the introduction of redundance into the diagram.

Figure 6B:
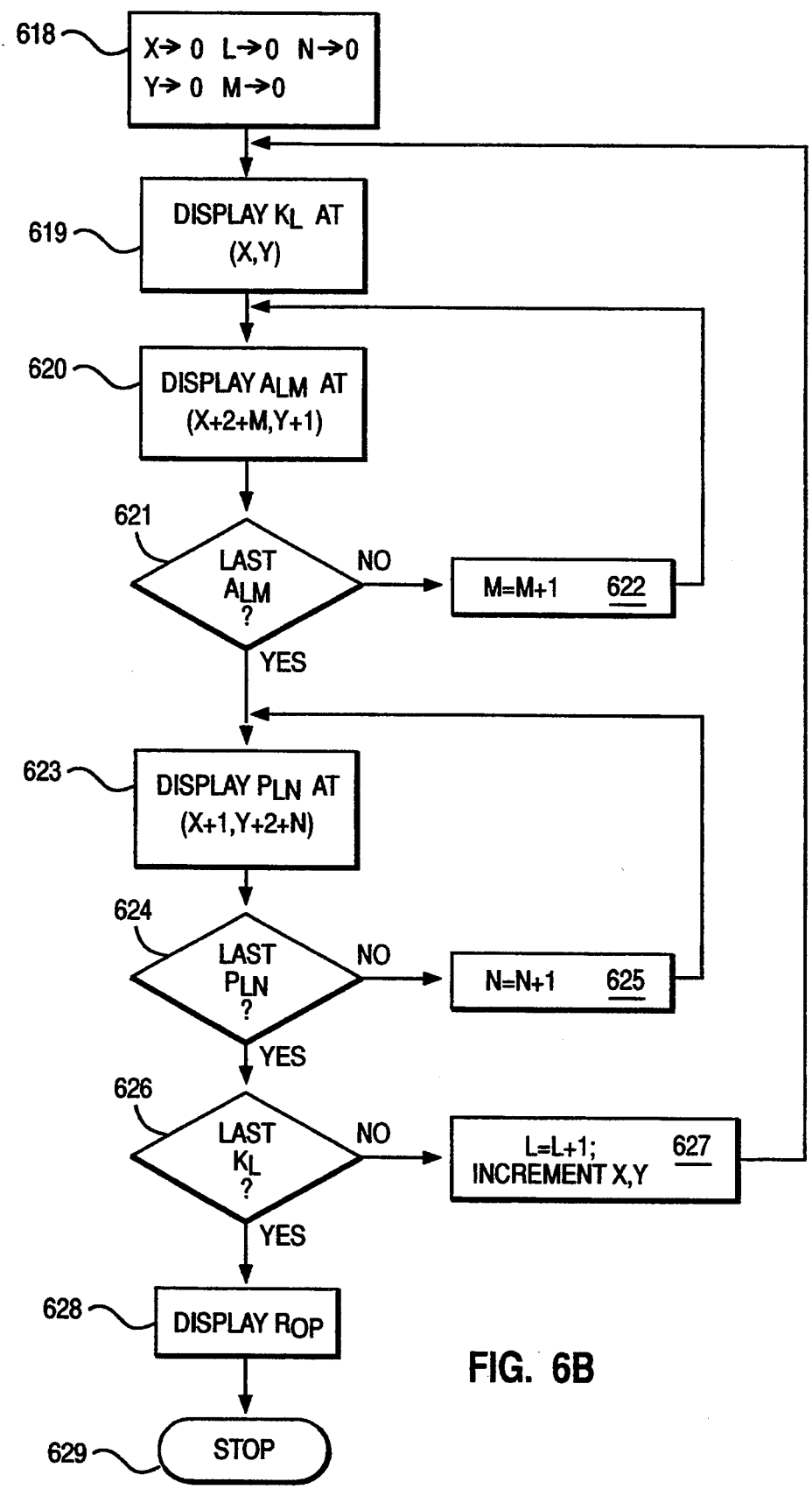

FIG. 6B shows a flow-chart which illustrates one way of carrying out the inventive method for displaying. In step 618 the variables x, y, L, M and N are initialized to equal 0. In step 619 the first kernel entity set $K_0$ is displayed at the array position (x=0, y=0) which is also shown in FIG. 5. In step 620 the attributive entity set $A_{00}$ is displayed at the array position (x+2+M=2, y+1=1). In step 621 it is decided whether all attributive entity sets $A_{OM}$ are already displayed. Since the decision in this case is "no" the variable M is incremented in step 622, so that consequently in step 620 the attributive entity set $A_{01}$ is displayed at the position (3,1). Subsequently, by carrying out steps 623, 624 and 625 the role entity sets $P_{LN}$ are displayed at the positions (x+1=1, y+2+N=2) and (1,3), respectively. This is analogous to the above described steps 620, 621 and 622.

If it is decided in step 624 that all role entity sets are displayed, it is decided in step 626 whether all kernel entity sets are displayed. If the decision is "no", the variables L, and x are incremented in step 627, so that in this case L=1, and x=4. Then the control returns back to step 619. This procedures is repeated until all kernel entity sets and their corresponding attributive and role entity sets are displayed. Further, in step 628 the relation entity sets $R_{UP}$ are displayed in the first section of the diagram. The flow of operations stops at step 629. It is to be noted, that in the more general case considered above the flow of operation illustrated with reference to FIG. 6B is modified correspondingly. In this case after step 623, the attributive and role entity sets of which $P_{LN}$ is the mother entity set are displayed.

It is to be noted that the above described inventive techniques for storing and displaying of an entity relationship diagram according to the invention are particularly beneficial, if the diagram is updated. Deletion of a particular kernel entity set $K_Z$ from the diagram e.g. is performed by deletion of the corresponding sequence number Z. If a kernel entity set $K_A$ is to be inserted into the diagram this is done by storing of the corresponding sequence number A together with the associated information about the kernel entity set $K_A$. Thus it is not necessary to redraw the whole diagram because the updated diagram is generated automatically by the computer system. This is possible due to the semantic information about the relative neighborhood arrangement associated to the entity sets stored in the computer as well as the specific rules for displaying according to the invention.

Thereby it is also possible to generate condensed partial views of the diagram without changing the diagram. This is done by specifying the indices of the entity sets which are to be displayed.

The order of kernel role or attributive entities in the horizontal or vertical direction is up to the specific problem area. One way of determining the order of kernel entity sets in the horizontal direction along the line 7 may be an alphabetical ordering according to the names of the kernel entity sets. The same could be done to determine the order of role entity sets having the same mother entity set in the vertical direction as well as to determine the order of attributive entity sets having the same mother entity set in the horizontal direction.

It is to be noted that a computer system, such as a graphic tool, incorporating the teaching of the invention is also advantageous over the prior art, since the semantic information which is input by the user is checked automatically as to inconsistencies. If a user tries to input e.g. a relation entity set between two role entity sets this is recognized by the computer system as an invalid operation and the user is prompted to correct this operation. Thus no inconsistencies and redundant information is inputted.

Figure 7:
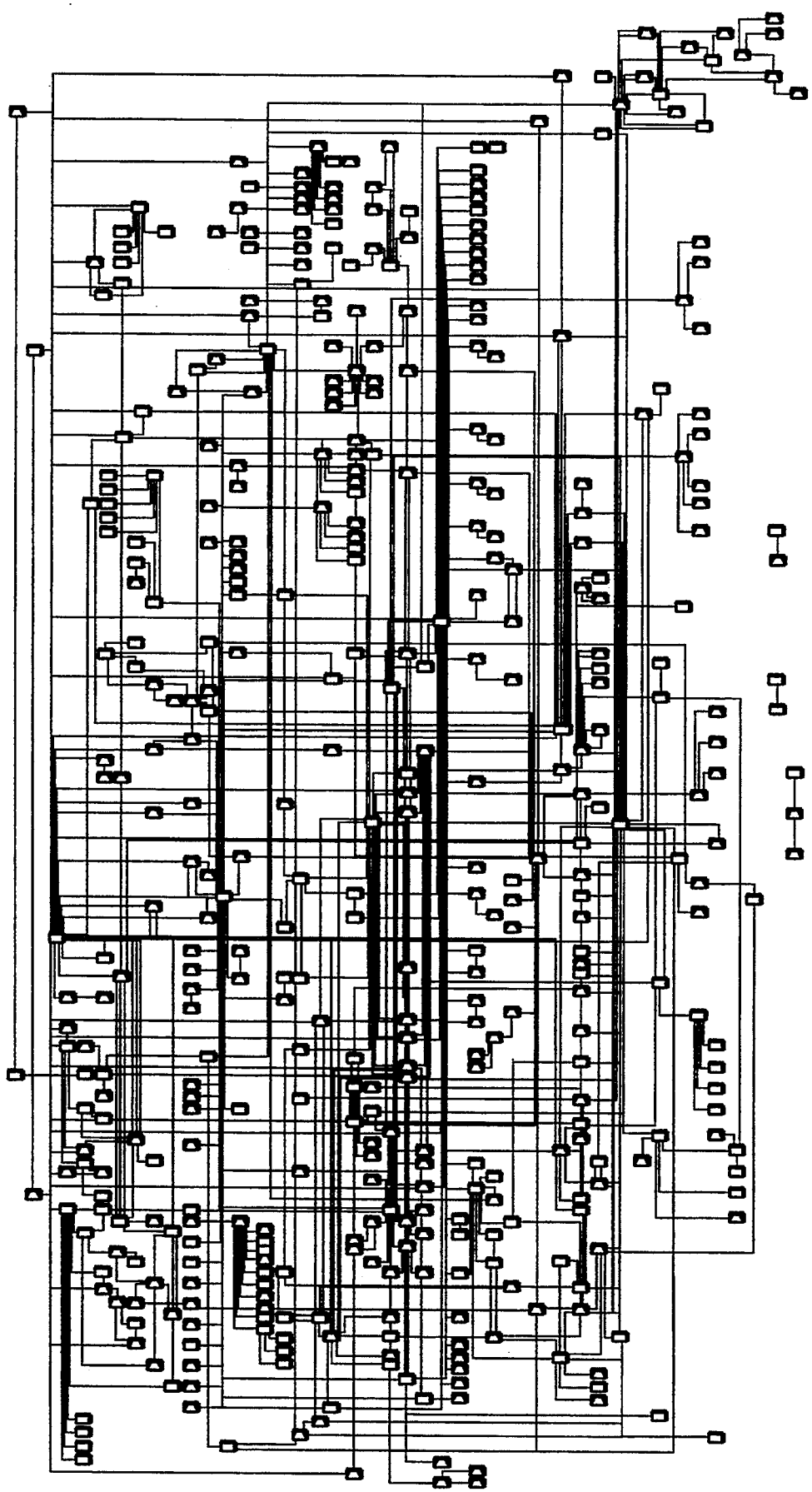
FIG. 7 shows an entity relationship diagram of a complex entity relationship model according to the prior art.
Figure 8:
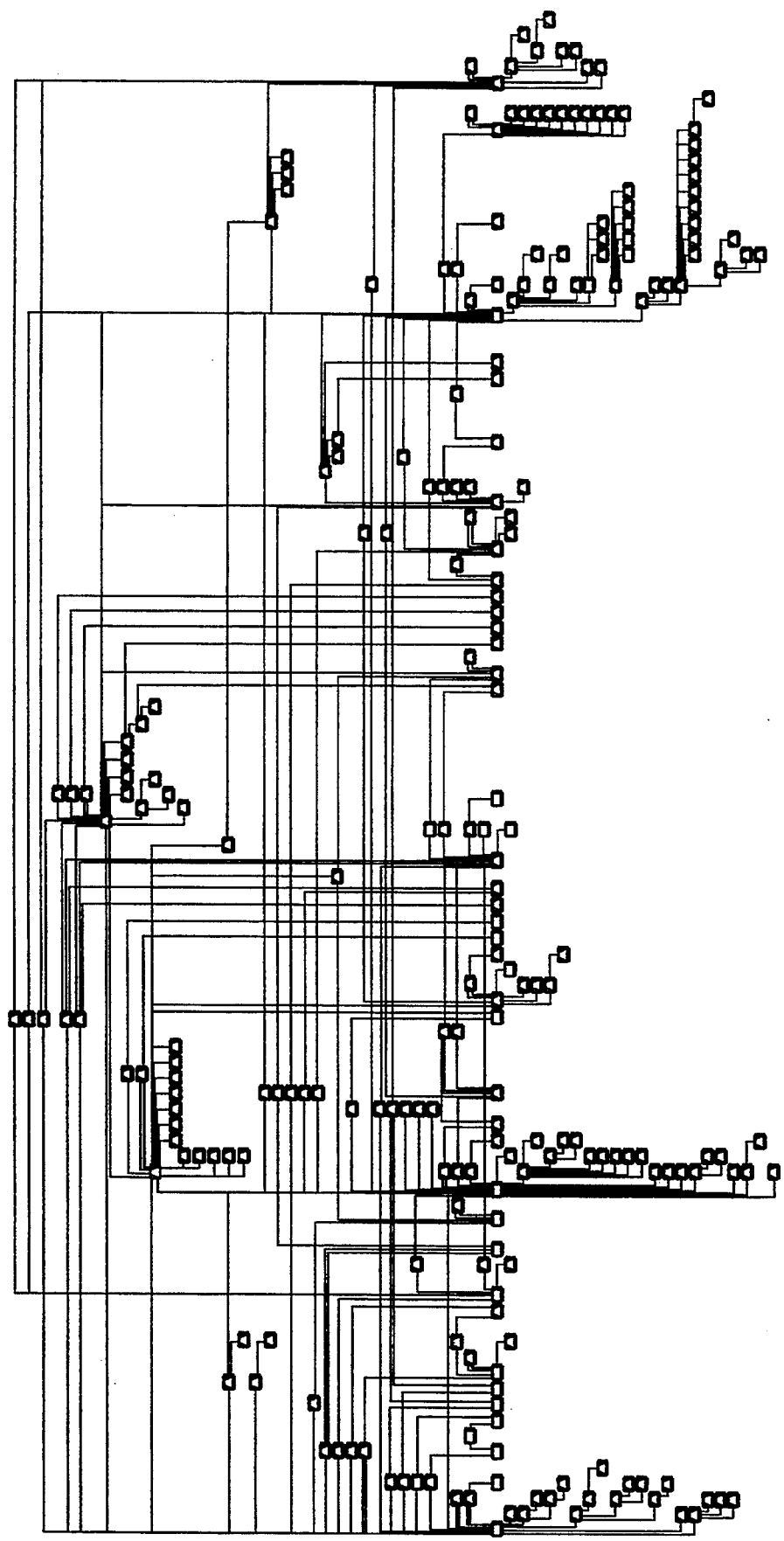
FIG. 8 shows an entity relationship diagram according to the invention.

FIG. 7 shows an entity relationship diagram according to the prior art. This diagram is restructured according to the teaching of the invention. The result is shown in FIG. 8 which apparently shows the elimination of redundancy with respect to the prior art diagram.

It is to be noted that the entity relationship diagram of the invention may be transformed to an optimized database—such as a relational database. This transformation may be carried out by known methods. The resulting database may serve as a repository which is adapted to store instances of the entity sets of the diagram. Since the entity relationship diagram is redundancy free, the same applies as a consequence to the resulting data base. This also results in optimal access paths and a minimized access time to the instances stored in that database.

What is claimed is:

1. A method for storing and displaying of an entity relationship diagram in a computer system comprising storage means, said method comprising the steps of
   a) storing of first data representative of a sequence of kernel entity sets $K_i$, where a kernel entity set $K_i$ is a class of kernel entities $e_i$;
   b) storing of second data representative of relation entity sets $R_i$, where a relation entity set $R_i$ is a class of relations among a number n of kernel entities $e_i$, each taken from a kernel entity set $K_i$ according to the definition D $$D: \{[e_1, e_2, \ldots e_n] | e_i \in K_1, e_2 \in K_2, \ldots e_n \in K_n\},$$

and where the kernel entity sets $K_i$ in the definition D may not be distinct, whereby said second data comprise information as to the assignment of each of said relation entity sets $R_i$ to at least one of said kernel entity sets;
   c) logically partitioning a display into at least a first and a second section;
   d) displaying of the kernel entity sets $K_i$ represented by a first class of symbols in said first section of said display; and
   displaying of the relation entity sets $R_i$ represented by a second class of symbols in said second section.

2. A method for storing of an entity relationship diagram according to claim 1, said method further comprising the steps of
   storing of third data representative of role entity sets $P_i$, where a role entity set $P_i$ is a class of roles of entities $e_i$ comprised in a kernel entity set $K_i$, whereby said third data comprise information to which one of said kernel entity sets $K_i$ a role entity set $P_i$ belongs; and
   displaying at least one of said role entity sets by a third class of symbols in said first section.

3. A method for storing of an entity relationship diagram according to claim 2, said method further comprising the steps of
   storing of fourth data representative of attributive entity sets $A_i$, where each attributive entity set $A_i$ has an attribute associated thereto and an attribute is defined as a function f which maps from a kernel entity set $K_i$ or a role entity set $P_i$ into an attributive entity set $A_i$ or a cartesian product of attributive entity sets $A_i$ f: $K_i$ or $P_i \rightarrow A_i$ or $A_{i1} \times A_{i2} \times A_{in}$, whereby said fourth data comprise information to which one of said kernel entity sets $K_i$ or said role entity sets $P_i$ an attributive entity set $A_i$ belongs; and
   displaying said attributive entry sets represented by a fourth class of symbols in said first section.

4. A method according to claim 3, wherein the order of kernel entity sets $K_i$ in said sequence is defined by an index $x_i$ which is assigned to each of said kernel entity sets $K_i$, said index $x_i$ being comprised in said first data.

5. A method according to claim 4, wherein said step of logically dividing said display into two sections is along a horizontal or vertical line and said method further comprising the steps of
   storing of further first data representative of a further kernel entity set $K_i$, whereby the position of said further kernel entity set $K_i$ in said sequence is defined by assigning an index $x_i$; and
   displaying said kernel entry sets $K_i$ along said line.

6. A method for displaying of an entity relationship diagram on the display of a computer system, said entity relationship diagram being stored in said computer system, characterized by the steps of
   a) logically partitioning said display into at least a first and a second section;
   b) displaying of kernel entity sets $K_i$ represented by a first class of symbols in said first section of said display, where a kernel entity set $K_i$ is a class of kernel entities $e_i$;
   c) displaying of relation entity sets $R_i$ represented by a second class of symbols in said second section, where a relations entity set $R_i$ is a class of relations among a number n of kernel entities $e_i$, each taken from a kernel entity set $K_i$ according to the definition D $$D: \{[e_1, e_2, \ldots e_n] | e_i \in K_1, e_2 \in K_2, \ldots e_n \in K_n\},$$

whereby the kernel entity sets $K_i$ in the definition D may not be distinct.

7. A method according to claim 6, said kernel entity sets $K_i$ comprising role entity sets $P_i$, where a role entity set $P_i$ is a class of roles of entities $e_i$ comprised in a kernel entity set $K_i$, said method further comprising a step of displaying at least one of said role entity sets represented by a third class of symbols in said first section.

8. A method according to claim 7, said kernel entity sets $K_i$ comprising attributive entity sets $A_i$, where each attributive entity set has an attribute associated thereto and an attribute is defined as a function f which maps from a kernel entity set $K_i$ or a role entity set $P_i$ into an attributive entity set $A_i$ or a cartesian product of attributive entity sets $A_i$ f: $K_i$ or $P_i \rightarrow A_i$ or $A_{i1} \times A_{i2} \times \ldots \times A_{in}$, said method further comprising a step of displaying said attributive entity sets represented by a fourth class of symbols in said first section.

9. A method according to claim 8, said method further comprising the steps of defining an array of allowable positions on said display; and arranging said symbols in said positions.

10. A method according to claim 9, said partitioning step comprising a step of logically dividing said display into two sections along a horizontal or vertical line, whereby said kernel entity sets $K_i$ are displayed along that line.

11. A method according to claim 10, wherein said entity relationship diagram is stored as a vectorgraph.

12. A method according to claim 10, wherein said entity relationship diagram is stored in a computer system comprising storage means, said method further comprising the steps of
   a) storing of first data representative of a sequence of kernel entity sets $K_i$, where a kernel entity set $K_i$ is a class of kernel entities $e_i$;
   b) storing of second data representative of relation entity sets $R_i$, where a relation entity set $R_i$ is a class of relations among a number n of kernel entities $e_i$, each taken from a kernel entity set $K_i$ according to the definition D $$D: \{[e_1, e_2, \ldots e_n] | e_i \in K_1,$$
$$e_2 \in K_2, \ldots e_n \in K_n\},$$

and where the kernel entity sets $K_i$ in the definition D may not be distinct, whereby said second data comprise information as to the assignment of each of said relation entity sets $R_i$ to at least one of said kernel entity sets.

13. A method according to claim 10, wherein the absolute and/or relative position of each kernel entity set $K_i$ which is displayed along that line is determined by the order of kernel entity sets $K_i$ in said sequence.

14. A method according to claim 6, wherein symbols belonging to different ones of said classes of symbols have a different shape and symbols belonging to the same class of symbols may only differ as to their size.

15. A method according to claim 14, wherein relations within said class of relations are mathematical relations.

16. A computer system for displaying of an entity relationship diagram, said system comprising
   a) means for storing of first data representative of a sequence of kernel entity sets $K_i$, where a kernel entity set is a class of kernel entities $e_i$ and for storing of second data representative of relation entity sets $R_i$, where a relation entity set $R_i$ is a class of relations among a number n of kernel entities $e_i$, each taken from a kernel entity set $K_i$ according to the definition D $$D: \{[e_1, e_2, \ldots e_n] | e_i \in K_1,$$
$$e_2 \in K_2, \ldots e_n \in K_n\},$$

and where the kernel entity sets $K_i$ in the definition D may not be distinct, whereby said second data comprise information as to the assignment of each of said relation entity sets $R_i$ to at least one of said kernel entity sets,
   b) display means logically partitioned into at least a first and a second section,
   c) means for generating a first class of symbols to display a representation of said kernel entity sets in said first section and for generating a second class of symbols to display a representation of said relation entity sets $R_i$ in said second section, whereby said means for generating are interconnected to said means for storing and to said display means.

17. A computer system according to claim 16, wherein said means for storing stores third data representative of role entity sets $P_i$, where a role entity set $P_i$ is a class of roles of entities $e_i$ comprised in a kernel entity set $K_i$, whereby said third data comprise information to which one of said kernel entity sets $K_i$ a role entity set $P_i$ belongs, and said means for generating is adapted to generate a third class of symbols to display a representation of said kernel entity sets in said first section.

18. A computer system according to claim 17, wherein said means for storing stores fourth data representative of attributive entity sets $A_i$, where each attributive entity set has an attribute associated thereto and an attribute is defined as a function f which maps from a kernel entity set $K_i$ or a role entity set $P_i$ into an attributive entity set $A_i$ or a cartesian product of attributive entity sets $A_i$ $$f: K_i \text{ or } P_i \rightarrow A_i \text{ or } A_{i1} \times A_{i2} \times \ldots \times A_{in},$$

whereby said fourth data comprise information to which one of said kernel entity sets $K_i$ or said role entity sets $P_i$ an attributive entity set belongs, and said means for generating is adapted to generate a fourth class of symbols to display a representation of said attributive entity sets in said first section.

19. A computer system according to claim 16, said system comprising input means, such as a mouse, especially to define the partitioning of said display means.

* * * * *

UNITED STATES PATENT AND TRADEMARK OFFICE
CERTIFICATE OF CORRECTION

PATENT NO. : 5,386,571
DATED : January 31, 1995
INVENTOR(S) : Wolfgang Kurz

It is certified that error appears in the above-indentified patent and that said Letters Patent is hereby corrected as shown below:

Col. 9, line 49, delete "tile" and insert --the--;
Col. 12, line 4, after "X", second occurrence, insert
--...X--; and
line 24, delete "entry" and insert --entity--.

Signed and Sealed this

Eleventh Day of June, 1996

Attest:

BRUCE LEHMAN

Attesting Officer

Commissioner of Patents and Trademarks